US011906111B2

(12) United States Patent
Rosenbaum et al.

(10) Patent No.: US 11,906,111 B2
(45) Date of Patent: Feb. 20, 2024

(54) DELIVERY TANK WITH PRESSURE REDUCTION, SATURATION AND DESATURATION FEATURES

(71) Applicant: Chart Inc., Ball Ground, GA (US)

(72) Inventors: Radek Rosenbaum, Decin (CZ); Jan Kubica, Liberec (CZ)

(73) Assignee: Chart Inc., Ball Ground, GA (US)

( * ) Notice: Subject to any disclaimer, the term of this patent is extended or adjusted under 35 U.S.C. 154(b) by 275 days.

(21) Appl. No.: 17/186,069

(22) Filed: Feb. 26, 2021

(65) Prior Publication Data

US 2021/0270420 A1 Sep. 2, 2021

Related U.S. Application Data

(60) Provisional application No. 62/983,901, filed on Mar. 2, 2020.

(51) Int. Cl.
*F17C 7/02* (2006.01)
*F17C 1/12* (2006.01)

(52) U.S. Cl.
CPC .................. *F17C 7/02* (2013.01); *F17C 1/12* (2013.01); *F17C 2201/0119* (2013.01); *F17C 2203/0391* (2013.01); *F17C 2203/0619* (2013.01); *F17C 2205/0134* (2013.01); *F17C 2205/0352* (2013.01); *F17C 2221/014* (2013.01); *F17C 2221/033* (2013.01); *F17C 2223/0161* (2013.01)

(58) Field of Classification Search
CPC ...... F17C 7/02; F17C 1/12; F17C 2201/0119; F17C 2227/0337; F17C 2227/0372; F17C 2227/0374; F17C 2227/0339
See application file for complete search history.

(56) References Cited

U.S. PATENT DOCUMENTS 4,608,831 A * 9/1986 Gustafson ................. F17C 3/08 62/48.1
6,505,469 B1 1/2003 Drube et al.
2005/0132719 A1 6/2005 Svensson et al.
2015/0204604 A1* 7/2015 Varrassi ................. F25J 1/0077 62/47.1

(Continued)

FOREIGN PATENT DOCUMENTS

CN 108386708 A 8/2018
EP 3196534 A1 7/2017

(Continued)

OTHER PUBLICATIONS

Extended European Search Report for European Application No. 21160255.2 dated Jul. 9, 2021.

(Continued)

*Primary Examiner* — Devon Russell
(74) *Attorney, Agent, or Firm* — Cook Alex Ltd.

(57) ABSTRACT

A cryogenic delivery tank includes a vessel having inner and outer shells and an interior that may contain a cryogenic liquid with a headspace above. A transfer pipe passes through the interior of the vessel and includes a head space coil positioned within an upper portion of the interior and a liquid side coil positioned in the lower portion of the interior. The transfer pipe has a first port adjacent to the head space coil and a second port adjacent to the liquid side coil. The first and second ports of the transfer pipe are configured to be removably attached to a second tank.

13 Claims, 7 Drawing Sheets

(56) References Cited

U.S. PATENT DOCUMENTS

| | | | |
|---|---|---|---|
| 2016/0252215 A1 | 9/2016 | Windmeier et al. | |
| 2018/0119872 A1* | 5/2018 | Lane | F16L 11/115 |
| 2019/0331298 A1 | 10/2019 | Thor et al. | |
| 2020/0208779 A1* | 7/2020 | Patelczyk | F17C 7/04 |

FOREIGN PATENT DOCUMENTS

| | | |
|---|---|---|
| FR | 2572161 A1 | 4/1986 |
| WO | 2015067840 A1 | 5/2015 |

OTHER PUBLICATIONS

Eurasian Patent Search Report for Eurasian Application No. 202190414 dated Sep. 14, 2021 and translation.

* cited by examiner

DELIVERY TANK WITH PRESSURE REDUCTION, SATURATION AND DESATURATION FEATURES

CLAIM OF PRIORITY

This application claims the benefit of U.S. Provisional Application No. 62/983,901, filed Mar. 2, 2020, the contents of which are hereby incorporated by reference.

FIELD OF THE DISCLOSURE

The present disclosure relates generally to a cryogenic delivery tank for fueling and defueling of an on-board vehicle tank or other use device with a cryogenic fuel, more particularly, the fueling and defueling of liquefied natural gas.

BACKGROUND

Natural gas is useful as an alternate fuel source for powering vehicle engines. It is typically stored and transported as Liquefied Natural Gas (LNG) because it occupies a much smaller volume (approximately $1/600^{th}$ the gaseous state). Temperature and pressure regulation of liquefied natural gas is extremely important. Liquefied Natural Gas is stored in insulated cryogenic tanks because of the low temperature requirements (~−160° C.) and typically at lower pressures. Furthermore, the stored cryogenic liquid is typically saturated, so that the gas and liquid states simultaneously exist at a desired temperature and pressure.

Vehicles utilizing natural gas typically include an on-board vehicle tank. On-board vehicle tanks may have specific pressure or temperature requirements. During the liquefied natural gas fueling and defueling of on-board vehicle tanks, pressure reduction for cooling of the vapor space of the liquefied natural gas delivery tank or increase in saturation pressure of the liquefied natural gas delivery tank is typically needed. Fueling of these vehicle tanks can, therefore, be a complicated process.

A prior art system for controlling conditions in a cryogenic delivery tank, as shown in FIG. 1, utilizes two additional tanks, a cryogenic tank 50 with cryogenic liquid 51 and vapor 52 and a high-pressure cylinder 40 containing cryogenic vapor. Cryogenic liquid 51 can comprise liquid nitrogen. The vapor within cylinder 40 can comprise natural gas. A delivery tank, indicated in general at 10, includes an inner shell 30 and an outer shell 20. Delivery tank 10 contains cryogenic liquid 11 and vapor 12. Cryogenic tank 50 is permanently connected to a first coil 70 by delivery line 52 which is installed in the vapor space or head space of the delivery tank 10. Delivery line 52 includes a valve or other known method of regulating the liquid input from tank 50, indicated generally by 53. High pressure cylinder 40 is permanently connected via delivery line 42 to a second coil 80, which is soldered on the inner side of the outer shell 20 of the delivery tank 10. Second delivery line 42 includes a valve or other known method of regulating the gas input from tank 40, indicated generally by 43.

Pressure reduction in the delivery tank 10 of FIG. 1 is accomplished by introducing liquified nitrogen 51 from tank 50 through coiled pipe 70 in the delivery tank. This causes a portion of the vapor 12 to condense, and the pressure within the tank is reduced. The liquified nitrogen shifts to cold nitrogen gas and exits out the top of the delivery tank through the second end of the coiled pipe 70 and is expelled via vent 71.

Saturation is accomplished by introducing natural gas from tank 40 into the delivery tank through second coil 80. Natural gas from tank 40 travels through the coil 80 and is warmed by heat transfer from ambient through the outer shell 20 and coil 80. The warmed natural gas is transferred to the bottom portion of delivery tank 10 and bubbles up through the liquid so as to warm it. In this current system, de-saturation is possible only by depressurization of the whole delivery tank. Venting of methane vapor 12 to atmosphere or burning of the methane vapor.

The above-described system utilizes two additional tanks and line connections between each of the additional tanks and the delivery tank. The processes for pressure reduction, increasing saturation, and decreasing saturation are complicated.

It is desirable to provide a transportable cryogenic liquid delivery tank to provide a simple and convenient solution for liquefied natural gas storage and associated fueling and defueling of liquefied natural gas vehicle tanks.

SUMMARY OF THE DISCLOSURE

There are several aspects of the present subject matter which may be embodied separately or together in the methods, devices and systems described and claimed below. These aspects may be employed alone or in combination with other aspects of the subject matter described herein, and the description of these aspects together is not intended to preclude the use of these aspects separately or the claiming of such aspects separately or in different combinations as set forth in the claims appended hereto.

In one aspect, a cryogenic liquid delivery tank includes a vessel with an inner shell and an outer shell. The inner shell of the vessel defines an interior configured to contain a cryogenic liquid with a headspace above the cryogenic liquid. The delivery tank has a transfer pipe passing through the interior of the vessel including a head space coil positioned within an upper portion of the interior and a liquid side coil positioned in a lower portion of the interior. The transfer pipe has a first port adjacent to the head space coil and a second port adjacent to the liquid side coil. The first and second ports of the transfer pipe are configured to be removably attached to a second tank.

In another aspect, a cryogenic liquid delivery tank system includes a first cryogenic liquid delivery tank that includes a vessel with an inner shell and an outer shell. The inner shell of the vessel defines an interior configured to contain a cryogenic liquid with a headspace above the cryogenic liquid. The delivery tank has a transfer pipe passing through the interior of the vessel including a head space coil positioned within an upper portion of the interior and a liquid side coil positioned in a lower portion of the interior. The transfer pipe has a first port adjacent to the head space coil and a second port adjacent to the liquid side coil. The cryogenic liquid delivery tank also includes a second cryogenic tank. The second cryogenic tank has a second tank inferior configured to hold a second cryogenic liquid with a second head space above the second cryogenic liquid. The second cryogenic tank has a gas outlet pipe and a liquid outlet pipe. The gas outlet pipe is in fluid communication with a top portion of the second tank interior and configured to removably connect to the second port. The liquid outlet pipe is in fluid communication with a bottom portion of the second tank interior and configured to removably connect to the first and/or second ports of the transfer pipe.

In an additional aspect, a method of adjusting a pressure of a first cryogenic liquid stored in a delivery tank includes providing a transfer pipe in the interior of the vessel. The transfer pipe includes a head space coil positioned within an upper portion of the interior and a liquid side coil positioned in a lower portion of the interior. A second cryogenic liquid is directed from a second tank first through the headspace coil and then through the liquid side coil or directed from the second tank first through the liquid side coil and then through the headspace coil. Alternatively, a gas is directed from the second tank first through the liquid side coil and then through the headspace coil so that an exhaust gas is produced. The exhaust gas is then vented.

In another aspect, a cryogenic liquid delivery tank system includes a first cryogenic liquid delivery tank that includes a vessel with an inner shell and an outer shell. The inner shell of the vessel defines an interior configured to contain a cryogenic liquid with a headspace above the cryogenic liquid. The delivery tank has a transfer pipe passing through the interior of the vessel including a head space coil positioned within an upper portion of the interior and a liquid side coil positioned in a lower portion of the interior. The transfer pipe has a first port adjacent to the head space coil and a second port adjacent to the liquid side coil. The cryogenic liquid delivery tank also includes a second tank. The second tank has a second tank inferior configured to hold a gas. The second tank has a gas outlet pipe. The gas outlet pipe is in fluid communication with the second tank interior and configured to removably connect to the second port.

DETAILED DESCRIPTION OF EMBODIMENTS

An embodiment of the disclosure provides a delivery tank with dual coiled transfer pipe, eliminating the need for separate first and second coil transfer pipe structures. An embodiment of the disclosure also eliminates the need for a second tank comprising natural gas in order to regulate pressure and saturation.

Figure 1:
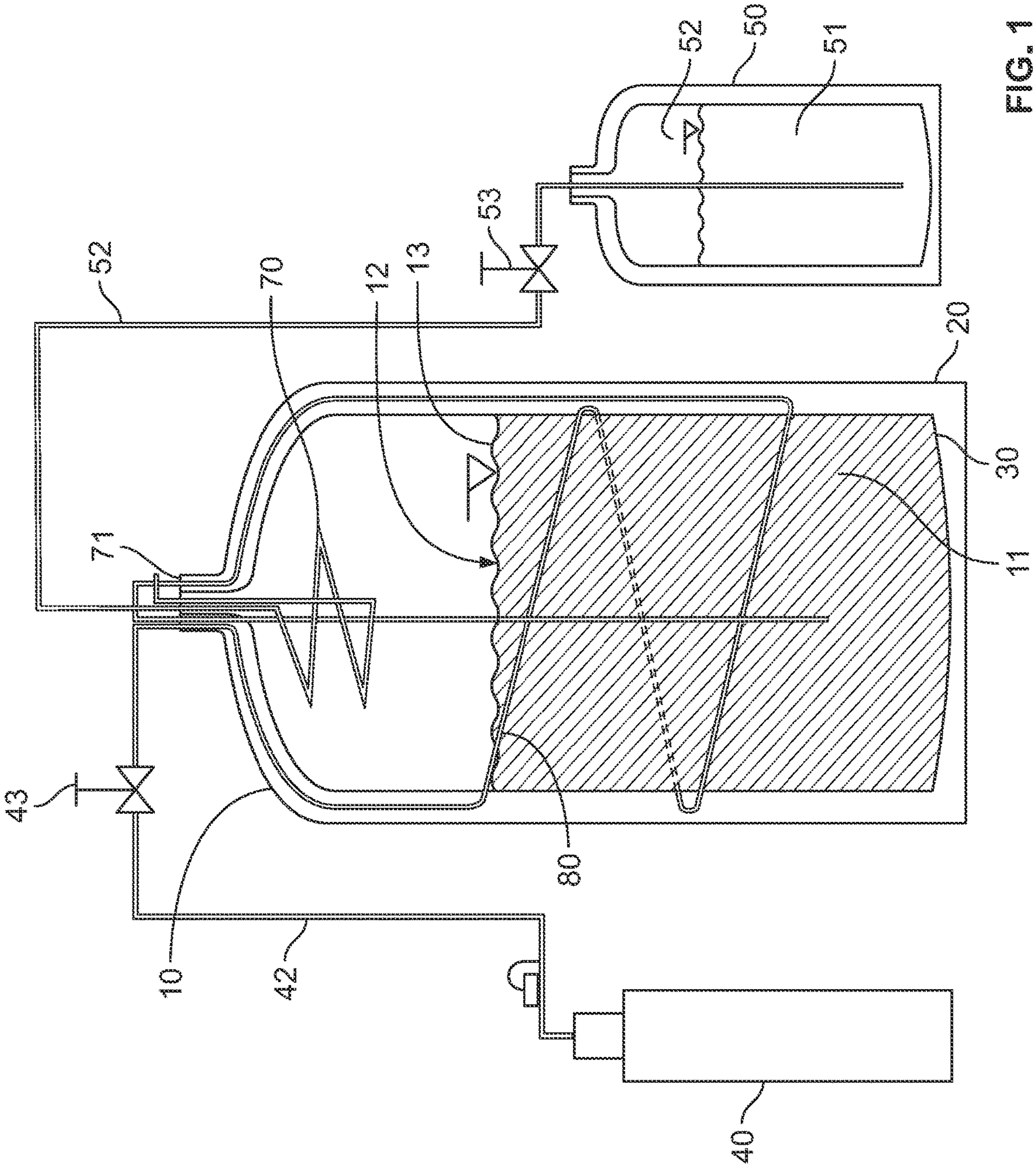
FIG. 1 (Prior Art)
FIG. 1 is a schematic illustration of a conventional cryogenic liquid delivery tank system.
Figure 2:
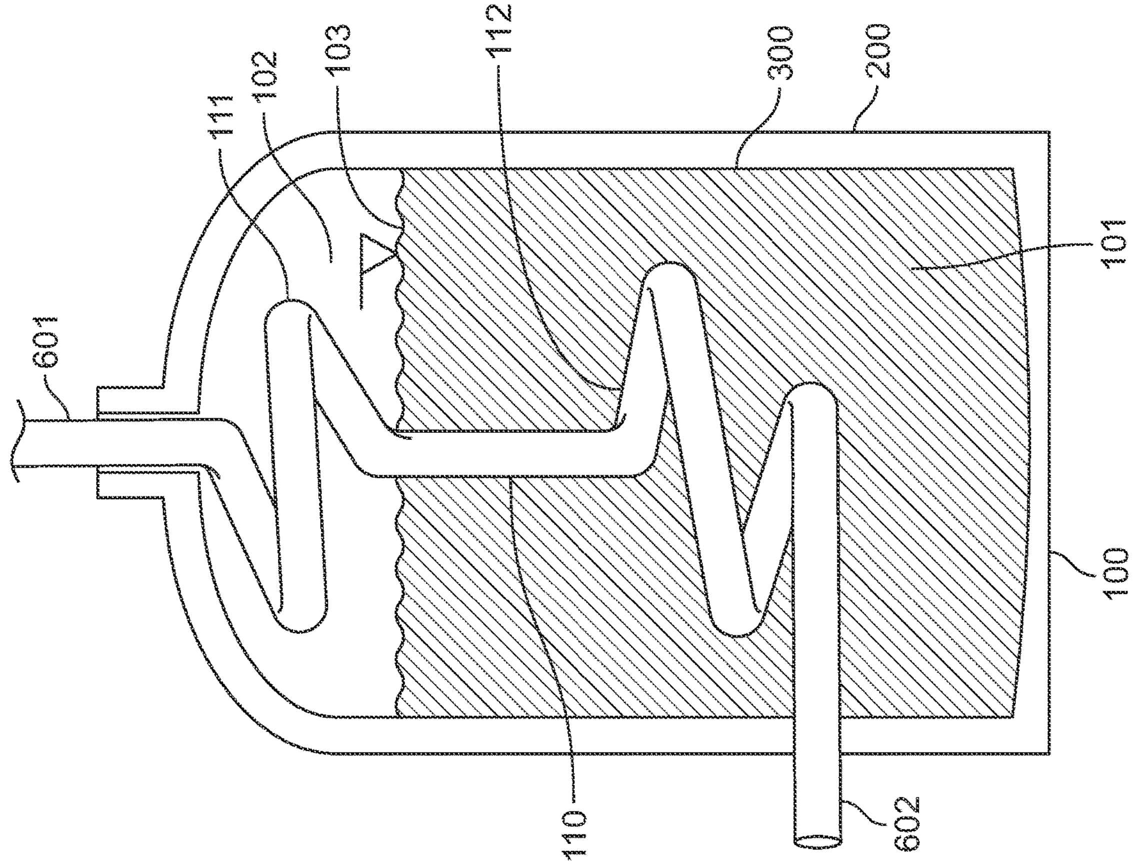
FIG. 2 is a schematic illustration of one embodiment of a delivery tank of the current disclosure.

FIG. 2 illustrates a cryogenic delivery tank 100 of the current disclosure. Cryogenic tank 100 is employed to store cryogenic liquid. For example, the cryogenic liquids can be at least one of nitrogen, helium, neon, argon, krypton, carbon dioxide, hydrogen, liquefied natural gas and oxygen, although other types of gases are within the scope of this disclosure. In a preferred embodiment cryogenic delivery tank 100 is used for storing and delivering liquefied natural gas.

In the illustrated embodiment, delivery tank 100 has an inner shell 300 and an outer shell 200, where the inner shell defines an interior of the tank. Cryogenic liquid 101 is stored within the interior of the inner shell 300. Cryogenic liquid 101 occupies a specific volume of delivery tank 100, with the remaining volume occupied by cryogenic gas or vapor 102. The liquid level 103 is included for illustrative purposes, but the liquid level may vary, especially at different events (delivery of LNG, intake of LNG).

Delivery tank 100 has a dual coiled transfer pipe 110 installed inside the inner shell 300 of the delivery tank. Dual coiled transfer pipe 110 can be installed by any known methods in the art. In the illustrated embodiment, as shown in FIG. 2, transfer pipe 110 includes two coiled sections forming a headspace coil 111 and a liquid side coil 112. Transfer pipe 110 can include more or less than two coiled sections in different embodiments. Coiled sections 111 and 112 are within the interior of the cryogenic delivery tank. Coiled sections 111 and 112 can utilize any coil shape known in the art. Coiled sections 111 and 112 can be placed in different parts of the inner shell 300 of the delivery tank 100. As illustrated in FIG. 2, coiled section 112 is in the top portion of the vessel, at least partially in the section of cryogenic gas 102, while coiled section 111 is in at the bottom of the vessel, at least partially within the section of cryogenic liquid 101.

Dual coiled transfer pipe 110 has a first pipe port 601 and a second pipe port 602 on the other end. First and second pipe ports 601 and 602 can be placed along different sides of the delivery tank 100. In a preferred embodiment, first pipe port 601 is at the top of the delivery tank vessel and the second pipe port 602 is placed on one side of the delivery tank. Both pipe ports can be outside the delivery tank 100. Both pipe ports can also be flush with the vessel edge or partially inside the vessel. As illustrated in FIG. 2, both pipe ports are accessible outside the vessel of the delivery tank 100. Although specific detail is not shown in the figures, both pipe ports (601 and 602) can feature a number of specific fittings. For instance, each other may comprise a removable and reusable seal. Each outlet may also include a valve or vent. The cross-sections of this pipe and other structures can have various shapes, such as a circle, ellipsis, square, triangle, pentagon, hexagon, polygon, and other shapes.

Each of coiled sections 111 and 112 may be in close proximity to or adjacent to first and second pipe ports 601 and 602. In the illustrated embodiment first coiled section 111 is adjacent to the first pipe port 601 and coiled section 112 is adjacent to the second pipe port 602.

In the illustrated embodiment, the cryogenic delivery tank 100 is a vertical tank. In other embodiments, the tank 100 may be a horizontal tank.

Cryogenic delivery tank 100 of the current invention, although shown as double walled, can be single or triple walled as well. The cryogenic tank can be made from copper alloy, nickel alloy, carbon, stainless steel or any other known material in the art.

Cryogenic delivery tank 100 may have insulation between inner and outer walls (or shells) and/or may be vacuum insulated. Single or multilayer insulation of any known materials for insulation can be utilized.

The inner vessel 300 can be joined to the outer vessel 200 by one or more inner vessel support members. For example, as known in the art, the inner vessel support member may connect the neck and base of the inner vessel to the outer vessel.

Cryogenic tank 100 may include devices or gauges for reading different characteristics of the tank. These devices or gauges can show pressure, temperature, differential pressure, liquid level, etc.

In the embodiment of FIG. 2, or any other embodiments of the current disclosure, the delivery tank 100 includes at least one pipe for filling liquefied natural gas or withdrawing it from the tank. In one embodiment there is a separate fill pipe and a separate withdrawal pipe. There may be other paths out of the inner vessel to fill and remove the liquid as well. The fill and withdrawal pipes may be any suitable conduit for conveying or allowing the flow of fluid therethrough.

Figure 3:
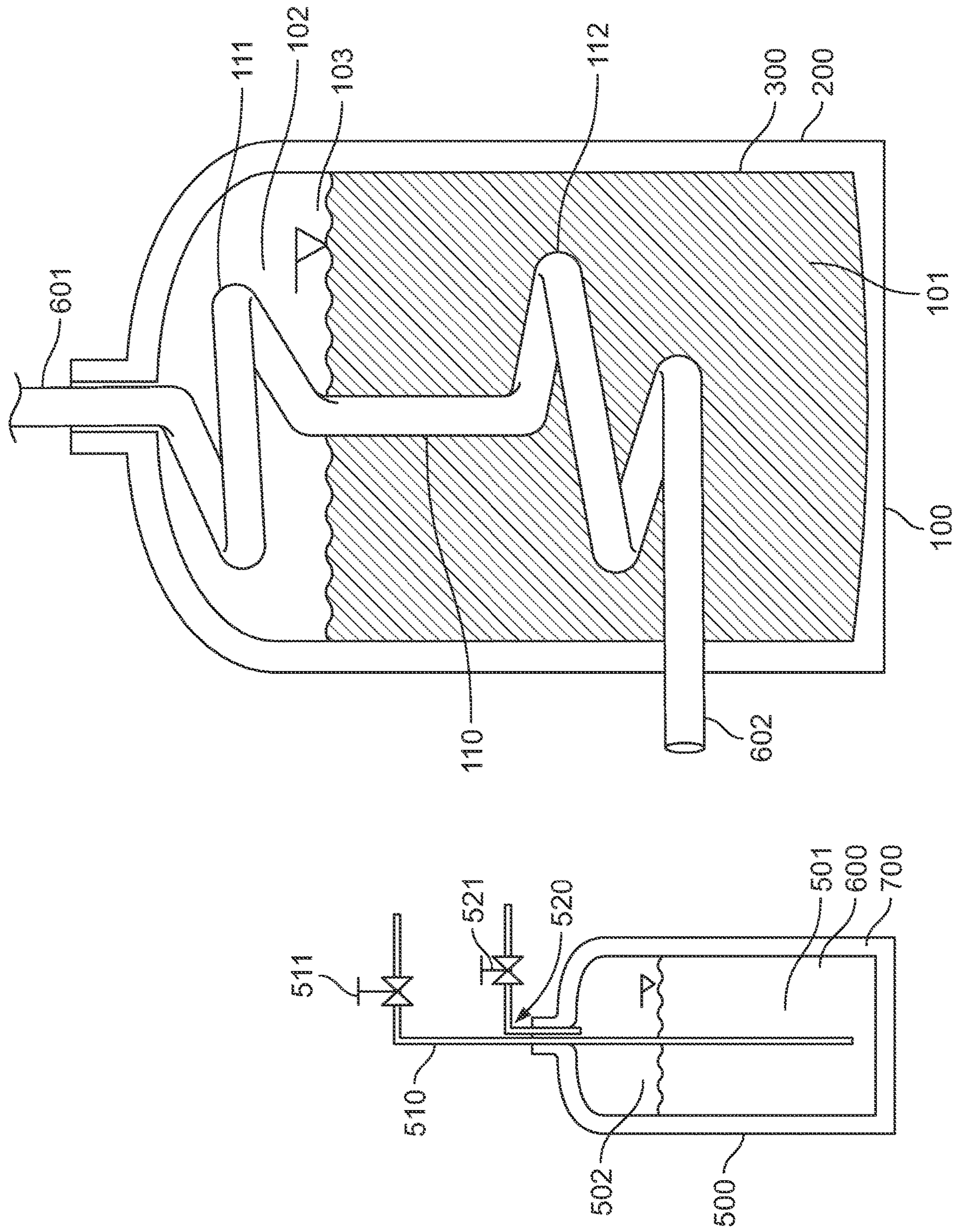
FIG. 3 is a schematic illustration of one embodiment of a delivery tank system of the current disclosure.

FIG. 3 illustrates an embodiment of a cryogenic delivery tank system of the current disclosure. In the illustrated embodiment, a second tank is present for connection to the cryogenic delivery tank 100. In one embodiment, the second tank is a cryogenic tank. Cryogenic tank 500 has a gas outlet pipe 520 and a liquid outlet pipe 510, above the liquid outlet pipe includes a dip tube. Although illustrated separately in the figure, outlets alternatively may be combined into one head from tank 500. Outlet pipes 520 and 510 may be connected to first and second pipe ports 601 and 602 of the dual coiled transfer pipe 110 of delivery tank 100. Pipe outlets of cryogenic tank 500 may be connected to either pipe port of the dual coiled transfer pipe 110 by flexible hose. Although a flexible hose is a preferred connection means, pipes of each tank may be connected by any other known connection means, including, but not limited to, insulated piping. The connection means may be permanent or temporary and can consist of any piping, tube, hose or appropriate conduit. In addition, the pipe outlets of cryogenic tank 500 may be selectively connected to ports 601 and 602 of tank 100 by lines that include one or more valves 511 and 521 to direct fluid from tank 500 to either port 601 or 602 in accordance with the configurations described below.

The second cryogenic tank 500 has an inner shell 600 and an outer shell 700. Cryogenic liquid 501 is stored within the inner shell 600. Cryogenic liquid occupies a specific volume of cryogenic tank 500, with the remaining volume occupied by cryogenic gas or vapor 502. The liquid level is included in the figures for illustrative purposes, but the liquid may vary, especially during different events (delivery of cryogenic liquids or gas, etc.).

In the illustrate embodiment, the second cryogenic tank 500 is a vertical storage tank. In other embodiments, the storage tank 500 may be a horizontal storage tank.

Cryogenic delivery tank 500 of the current invention, although shown as double walled, can be single or triple walled as well. The cryogenic tank can be made from copper alloy, nickel alloy, carbon, stainless steel or any other known material in the art.

Cryogenic tank 500 may also include devices or gauges for reading different characteristics of the tank. These devices or gauges can show pressure, temperature, differential pressure, liquid level, etc.

The second tank may be a gas tank in another embodiment. It can be a high pressure gas tank. The high pressure gas may be nitrogen. In this embodiment, second tank is filled with a gas and doesn't contain liquid. Second tank has a gas outlet pipe. The gas outlet pipe may be connected to first and second pipe ports 601 and 602 of the dual coiled transfer pipe 110 of delivery tank 100. Pipe outlets of the gas tank may be connected to either pipe port of the dual coiled transfer pipe 110 by flexible hose. Although a flexible hose is a preferred connection means, pipes of each tank may be connected by any other known connection means, including, but not limited to, insulated piping. The connection means may be permanent or temporary and can consist of any piping, tube, hose or appropriate conduit. In addition, the pipe outlet of the gas tank may be selectively connected to ports 601 and 602 of tank 100 by lines that include one or more valves to direct gas from the tank to either port 601 or 602 in accordance with the configurations described below.

Figure 4:
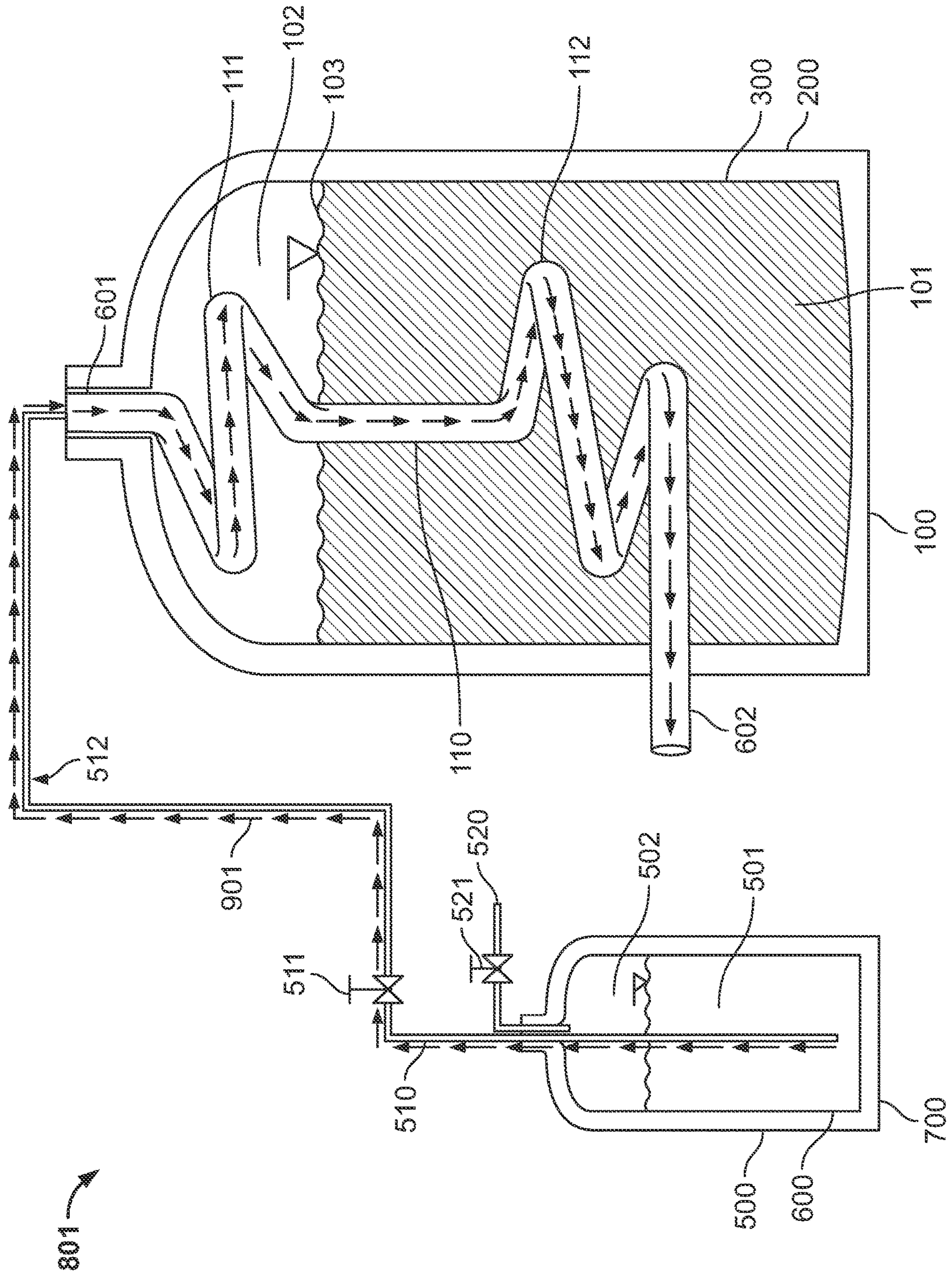
FIG. 4 is a schematic illustration of the pressure reduction operation of the current disclosure.

FIG. 4 illustrates a pressure reduction configuration of the cryogenic delivery tank system of the current disclosure, indicated in general at 801. When tank pressure needs to be reduced in the delivery tank 100, an operator connects the liquid outlet 510 of cryogenic tank 500 to the delivery tank 100 at first pipe port 601 of the dual coiled transfer pipe 110. As illustrated by the arrows in FIG. 4, the cold liquid from tank 500 passes through the transfer pipe 110 within the delivery tank 100 from first pipe port 601 to second pipe port 602. The cold liquid from tank 500 will cause condensation of the gas 102 while in coiled section 111 and drop of pressure in the delivery tank. As it continues to move through transfer pipe 110, the liquid changes state to a gas and exits at pipe port 602 as a gas.

Figure 5:
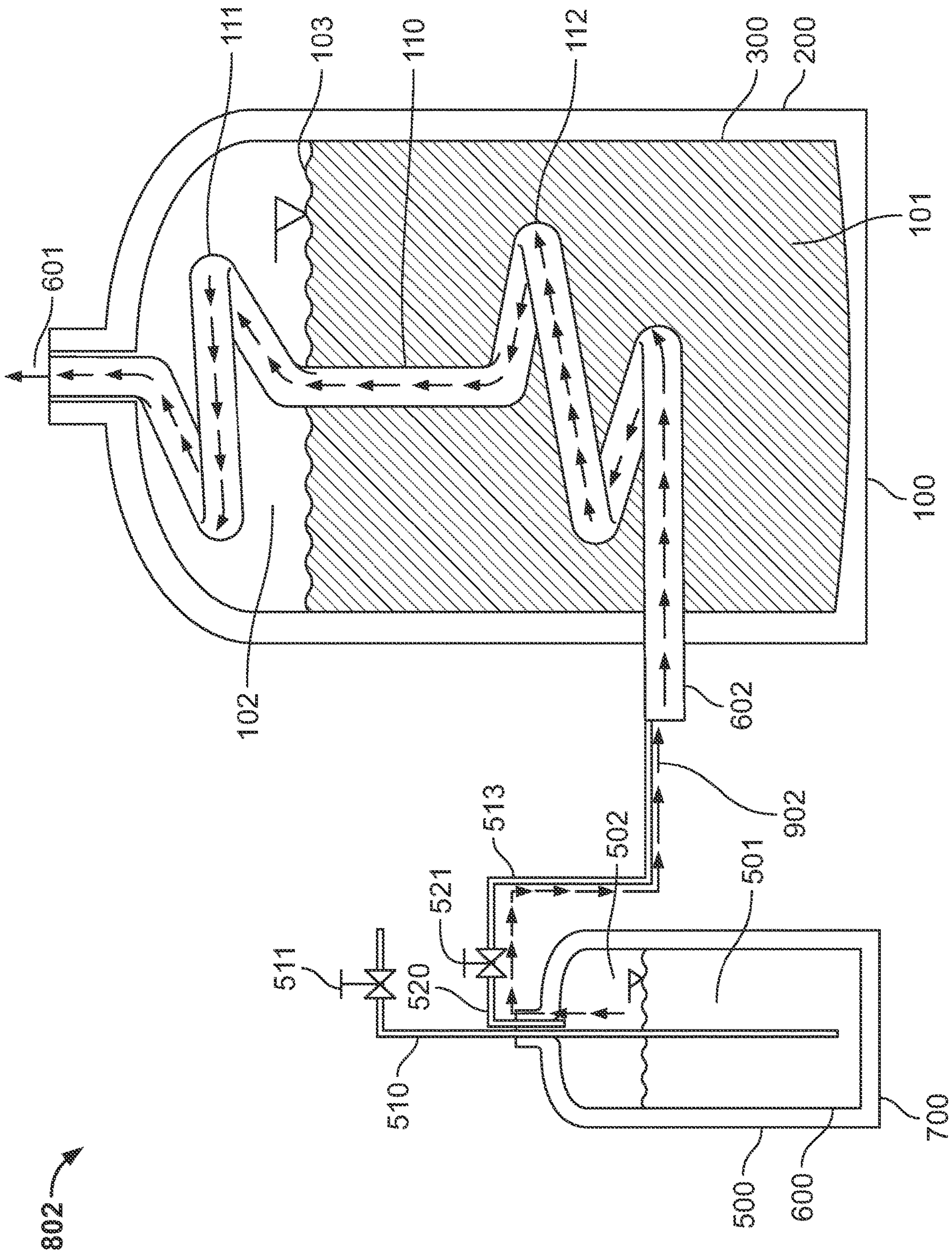
FIG. 5 is a schematic illustration of the saturation operation of the current disclosure.

FIG. 5 illustrates a saturation configuration of the cryogenic delivery tank system of the current disclosure, indicated in general at 802. When the saturation pressure of the cryogenic liquid 101 needs to be increased, the operator connects the gas outlet pipe 520 of the cryogenic tank 500 to the pipe port 602 of the dual coiled transfer pipe 110 of the delivery tank 100. As illustrated by the arrows in FIG. 5, the warm gas 502 passes through dual coiled transfer pipe 110 from second pipe port 602 to first pipe port 601 and is released as a colder gas. The warm gas heats the cryogenic liquid 101 while in coiled section 112 and increases the temperature and, therefore, the saturation pressure of the cryogenic liquid.

Saturation may also be accomplished when the second tank is a gas tank. When the saturation pressure of the cryogenic liquid 101 needs to be increased, the operator connects the gas outlet pipe 520 of the gas tank to the pipe port 602 of the dual coiled transfer pipe 110 of the delivery tank 100. Warm gas passes through dual coiled transfer pipe 110 from second pipe port 602 to first pipe port 601 and is released as a colder gas. The warm gas heats the cryogenic liquid 101 while in coiled section 112 and increases the temperature and, therefore, the saturation pressure of the cryogenic liquid.

Figure 6:
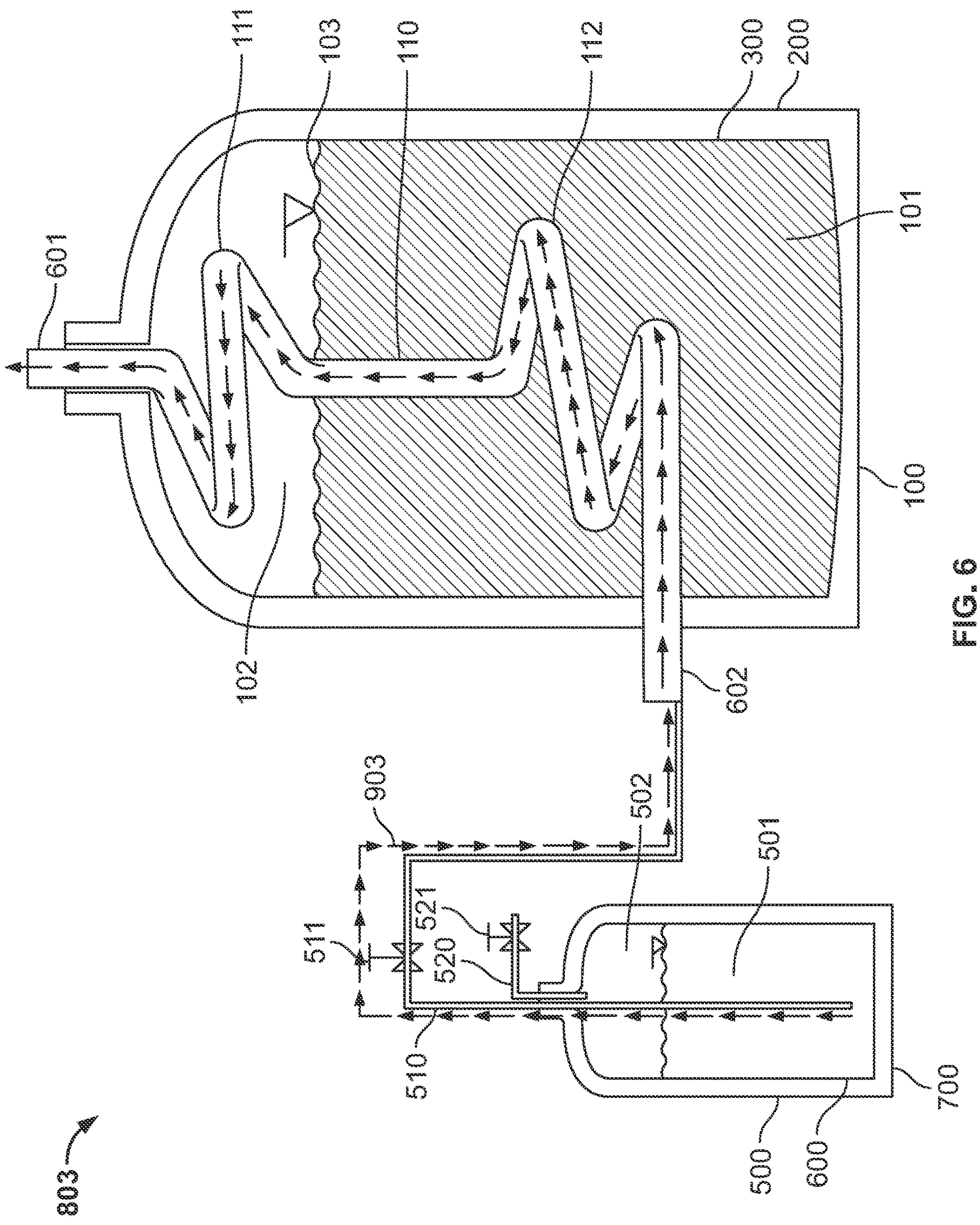
FIG. 6 is a schematic illustration of the de-saturation operation of the current disclosure.

FIG. 6 illustrates a de-saturation configuration of the cryogenic delivery tank system of the disclosure, indicated in general at 803. When the saturation pressure of the cryogenic liquid needs to be decreased, the liquid outlet pipe 510 of cryogenic tank 500 is connected to the second pipe port 602 of the dual coiled transfer pipe 110 of the cryogenic delivery tank 10. As illustrated by the arrows in FIG. 6, cold cryogenic liquid 501 is passed through the dual coiled transfer pipe 110 from the second pipe port 602 to the first pipe port 601. The cold liquid 501 cools cryogenic liquid 101 and exits first pipe port 601 as a cold gas. The saturation pressure of the cryogenic liquid will decrease.

Figure 7:
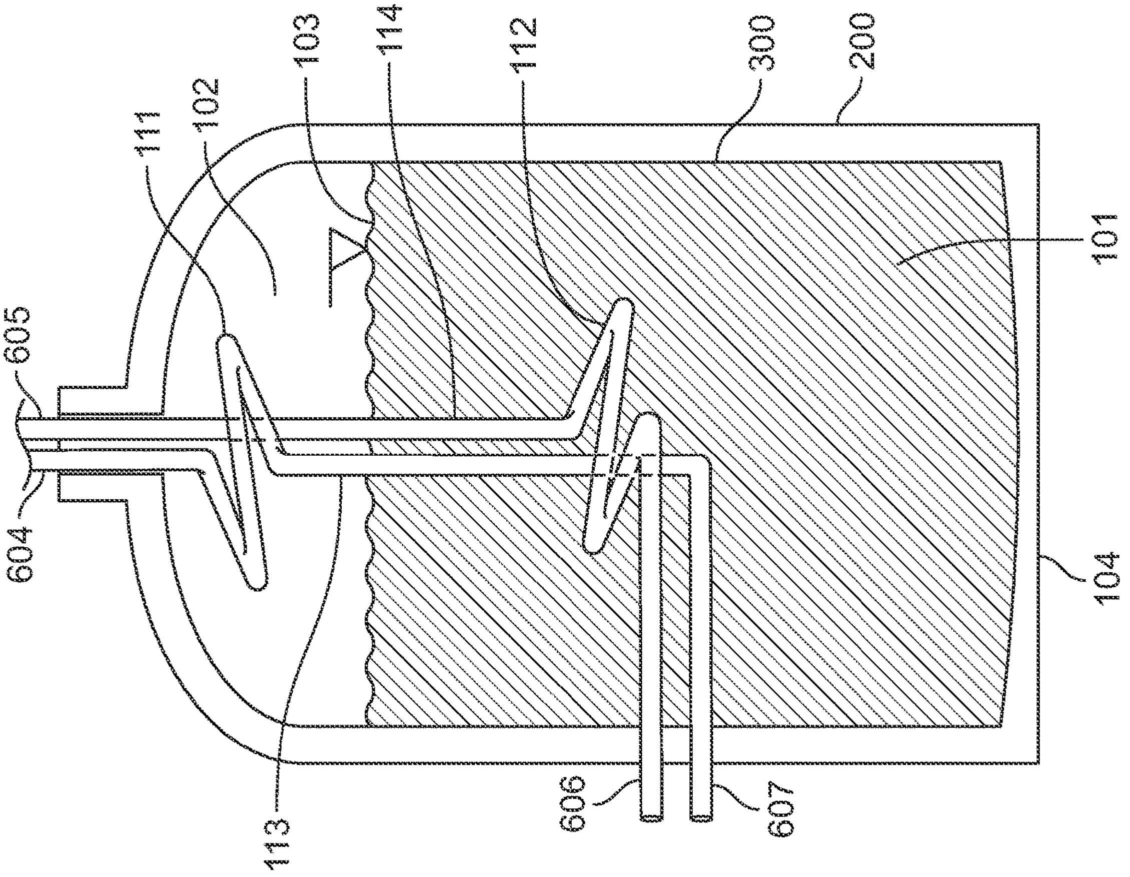
FIG. 7 is a schematic illustration of another embodiment of a delivery tank of the current disclosure.

FIG. 7 illustrates an additional embodiment of a cryogenic delivery tank 104 of the current disclosure. Cryogenic tank 104 is employed to store cryogenic liquid. For example, the cryogenic liquids can be at least one of nitrogen, helium, neon, argon, krypton, carbon dioxide, hydrogen, liquefied natural gas and oxygen, although other types of gases are within the scope of this disclosure. In a preferred embodiment cryogenic delivery tank 104 is used for storing and delivering liquefied natural gas.

In the illustrated embodiment, delivery tank 104 has an inner shell 300 and an outer shell 200, where the inner shell defines an interior of the tank. Cryogenic liquid 101 is stored within the interior of the inner shell 300. Cryogenic liquid 101 occupies a specific volume of delivery tank 104, with the remaining volume occupied by cryogenic gas or vapor 102. The liquid level 103 is included for illustrative purposes, but the liquid level may vary, especially at different events (delivery of LNG, intake of LNG).

Delivery tank 104 has a two transfer pipes 113 and 114 installed inside the inner shell 300 of the delivery tank. Transfer pipes 113 and 114 can be installed by any known methods in the art. In the illustrated embodiment, as shown in FIG. 7, first transfer pipe 113 includes a coiled section forming a headspace coil 111. Second transfer pipe 114 includes a coiled section 112. Coiled sections 111 and 112 are within the interior of the cryogenic delivery tank. Coiled sections 111 and 112 can utilize any coil shape known in the art. As illustrated in FIG. 7, coiled section 112 is in the top portion of the vessel, at least partially in the section of cryogenic gas 102, while coiled section 111 is in at the bottom of the vessel, at least partially within the section of cryogenic liquid 101.

Transfer pipe 113 has a first pipe port 604 and a second pipe port 607 on the other end. Transfer pipe 114 has a first pipe port 605 and a second pipe port 606 on the other end. Pipe ports 604, 605, 606 and 607 can be placed along different sides of the delivery tank 104. In a preferred embodiment, first pipe ports 604 and 605 are at the top of the delivery tank vessel and the second pipe ports 606 and 607 are placed on one side of the delivery tank. The pipe ports can be outside the delivery tank 104. The pipe ports can also be flush with the vessel edge or partially inside the vessel. As illustrated in FIG. 7, pipe ports are accessible outside the vessel of the delivery tank 104. Although specific detail is not shown in the figures, pipe ports (604, 605, 606 and 607) can feature a number of specific fittings. For instance, each may comprise a removable and reusable seal. Each port may also include a valve or vent. The cross-sections of this pipe and other structures can have various shapes, such as a circle, ellipsis, square, triangle, pentagon, hexagon, polygon, and other shapes.

Each of coiled sections 111 and 112 may be in close proximity to or adjacent to pipe ports 604, 605, 606 and 607. In the illustrated embodiment first coiled section 111 is adjacent to the first pipe ports 604 and 605 and coiled section 112 is adjacent to the second pipe ports 606 and 607.

In the illustrated embodiment, the cryogenic delivery tank 104 is a vertical tank. In other embodiments, the tank 104 may be a horizontal tank.

Cryogenic delivery tank 104 of the current invention, although shown as double walled, can be single or triple walled as well. The cryogenic tank can be made from copper alloy, nickel alloy, carbon, stainless steel or any other known material in the art.

Cryogenic delivery tank 104 may have insulation between inner and outer walls (or shells) and/or may be vacuum insulated. Single or multilayer insulation of any known materials for insulation can be utilized.

The inner vessel 300 can be joined to the outer vessel 200 by one or more inner vessel support members. For example, as known in the art, the inner vessel support member may connect the neck and base of the inner vessel to the outer vessel.

Cryogenic tank 104 may include devices or gauges for reading different characteristics of the tank. These devices or gauges can show pressure, temperature, differential pressure, liquid level, etc.

In the embodiment of FIG. 7, or any other embodiments of the current disclosure, the delivery tank 104 includes at least one pipe for filling liquefied natural gas or withdrawing it from the tank. In one embodiment there is a separate fill pipe and a separate withdrawal pipe. There may be other paths out of the inner vessel to fill and remove the liquid as well. The fill and withdrawal pipes may be any suitable conduit for conveying or allowing the flow of fluid therethrough.

While the preferred embodiments of the disclosure have been shown and described, it will be apparent to those skilled in the art that changes and modifications may be made therein without departing from the spirit of the disclosure, the scope of which is defined by the following claims.

What is claimed is:

1. A cryogenic liquid delivery tank system, comprising:

a vessel comprising an inner shell and an outer shell wherein the inner shell defines an interior configured to contain a first cryogenic liquid with a first cryogenic liquid headspace above the first cryogenic liquid;

a transfer pipe passing through the interior of the vessel, said transfer pipe including a head space coil positioned within an upper portion of the interior and a liquid side coil positioned in a lower portion of the interior;

the transfer pipe having a first port adjacent to the head space coil and a second port adjacent to the liquid side coil; and a second cryogenic tank including:

a second tank interior configured to hold a second cryogenic liquid with a second head space above the second cryogenic liquid, a gas outlet pipe in fluid communication with a top portion of the second tank interior and configured to removably connect directly to the second port so that a second gas from the second head space flows through the liquid side coil of the transfer pipe prior to flowing through the head space coil of the transfer pipe, and a liquid outlet pipe in fluid communication with a bottom portion of the second tank interior and configured to removably and alternately connect to the first port and directly to the second port so that the second cryogenic liquid flows through the liquid side coil of the transfer pipe prior to flowing through the head space coil of the transfer pipe when the liquid outlet pipe is connected to the second port.

2. The cryogenic liquid delivery system of claim 1, wherein the second cryogenic liquid is the same as the first cryogenic liquid.

3. The cryogenic liquid delivery system of claim 1, wherein the second cryogenic liquid is different from the first cryogenic liquid.

4. The cryogenic liquid delivery tank system of claim 1, wherein the first cryogenic liquid is liquefied natural gas.

5. The cryogenic liquid delivery tank system of claim 1, wherein the second cryogenic liquid is liquid nitrogen and the second gas is nitrogen.

6. The cryogenic liquid delivery tank system of claim 1, further comprising one or more flexible hoses configured to removably connect the gas outlet pipe to the second port and the liquid outlet pipe to the first and/or second ports.

7. The cryogenic liquid delivery tank system of claim 1, further comprising a plurality of lines including one or more valves configured to selectively connect the gas outlet pipe to the second port and the liquid outlet pipe to the first and/or second ports.

8. A method of adjusting a pressure of a first cryogenic liquid stored in a delivery tank comprising the steps of:

providing a transfer pipe in the interior of the vessel, said transfer pipe including a head space coil positioned within an upper portion of the interior and a liquid side coil positioned in a lower portion of the interior;

directing a second cryogenic liquid from a second tank first through the headspace coil and then through the liquid side coil;

directing cryogenic liquid from the second tank first through the liquid side coil and then through the headspace coil;

directing a second gas from the second tank first through the liquid side coil and then through the headspace coil so that an exhaust gas is produced; and venting the exhaust gas.

9. The method of claim 8, wherein the first cryogenic liquid is different from the second cryogenic liquid.

10. The method of claim 8, wherein the first cryogenic liquid is the same as the second cryogenic liquid.

11. The method of claim 8, wherein the pressure of the first cryogenic liquid is reduced.

12. The method of claim 8, wherein the saturation pressure of the first cryogenic liquid is increased.

13. The method of claim 8, wherein the saturation pressure of the second cryogenic liquid is decreased.

* * * * *